United States Patent
Kondo et al.

(10) Patent No.: US 6,941,210 B2
(45) Date of Patent: Sep. 6, 2005

(54) APPARATUS AND METHOD FOR CONTROLLING IGNITION TIMING DURING SHIFT IN VEHICULAR AUTOMATIC TRANSMISSION

(75) Inventors: Takahiro Kondo, Toyota (JP); Toshimitsu Sato, Toyota (JP); Hisanori Nomoto, Nisshin (JP); Naoyuki Sakamoto, Toyota (JP); Yoshiharu Harada, Toyota (JP); Toshio Sugimura, Nagoya (JP); Masayasu Mizobuchi, Tougou-cho (JP); Ryuji Imai, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 175 days.

(21) Appl. No.: 10/659,316

(22) Filed: Sep. 11, 2003

(65) Prior Publication Data

US 2004/0063540 A1 Apr. 1, 2004

(30) Foreign Application Priority Data

Sep. 27, 2002 (JP) ........................................ 2002-284260

(51) Int. Cl.$^7$ .............................................. F16H 59/74
(52) U.S. Cl. ........................... 701/54; 701/51; 477/102; 477/115
(58) Field of Search ............................... 701/51, 54, 86, 701/105; 477/101, 102, 115, 116

(56) References Cited

U.S. PATENT DOCUMENTS 5,086,666 A * 2/1992 Moriki ........................ 477/109
5,094,125 A * 3/1992 Bota ........................... 477/102
5,109,826 A * 5/1992 Kato ........................... 123/564
5,188,005 A * 2/1993 Sankpal et al. ............. 477/102
5,826,208 A * 10/1998 Kuroiwa et al. .............. 701/54
6,014,604 A * 1/2000 Kuroiwa et al. .............. 701/54

FOREIGN PATENT DOCUMENTS

| JP | 09286260 A | 11/1997 |
| JP | 10030466 A | 2/1998 |
| JP | 10184410 A | 7/1998 |

* cited by examiner

Primary Examiner—Gary Chin
(74) Attorney, Agent, or Firm—Oblon, Spivak, McClelland, Maier & Neustadt, P.C.

(57) ABSTRACT

An apparatus for controlling ignition timing during a shift in a vehicular automatic transmission is provided that is capable of suppressing shift shock in the event that input torque of the automatic transmission is affected by external changes, such as changes in fuel and air pressure and the like, by adjusting immediately to those changes. This control apparatus is provided with an ignition timing controller that controls an ignition timing retard amount; a calculator that calculates a basic retard amount; a detector that detects an engine retard amount; a determinator that determines a retard correction value based on a shift mode of the automatic transmission and the like; and a corrector that corrects the ignition timing retard amount of the controller based on the retard correction value, the basic retard amount, and the engine retard amount.

16 Claims, 12 Drawing Sheets

FIG. 2

| POSITION | | CLUTCHE & BRAKE | | | | | | | O.W.C. | |
|---|---|---|---|---|---|---|---|---|---|---|
| | | C1 | C0 | C2 | B1 | B2 | C3 | B3 | F1 | F2 |
| N, P | | × | × | × | × | × | × | ○ | × | × |
| R | | × | × | ○ | × | ○ | × | ○ | × | × |
| D | 1ST | ○ | × | × | × | × | × | ○ | ○ | △ |
| | 2ND | ○ | × | × | ○ | × | × | ○ | × | △ |
| | 3RD | ○ | ○ | × | × | × | × | ○ | × | △ |
| | 4TH | × | ○ | × | ○ | × | × | ○ | × | △ |
| | 5TH | × | ○ | × | ○ | × | ○ | × | × | × |
| | 1ST ENGINE BRAKE | ○ | × | × | × | ○ | × | ○ | △ | △ |

| VEHICLE SPEED V (km/h) \ INPUT TORQUE $T_{IN}$ (Nm) | SMALL ←——————→ LARGE | | | | |
|---|---|---|---|---|---|
| LOW | $B_{11}$ | · | · | · | $B_{1n}$ |
| ↕ | · | · | · | · | · |
| | · | · | · | · | · |
| HIGH | $B_{m1}$ | · | | | $B_{mn}$ |

FIG. 11

| VEHICLE SPEED V (km/h) \ SHIFT TYPE | 5→4 | 4→3 | 3→2 | 2→1 | 1→2 | 2→3 | 3→4 | 4→5 |
|---|---|---|---|---|---|---|---|---|
| 5~15 | $K_{11}$ | · | · | · | · | · | · | $K_{1n}$ |
| ~30 | · | · | · | · | · | | | · |
| ~60 | · | · | · | | | | | · |
| ~80 | · | · | | | | | | · |
| ~100 | $K_{m1}$ | | | | | | | $K_{mn}$ |

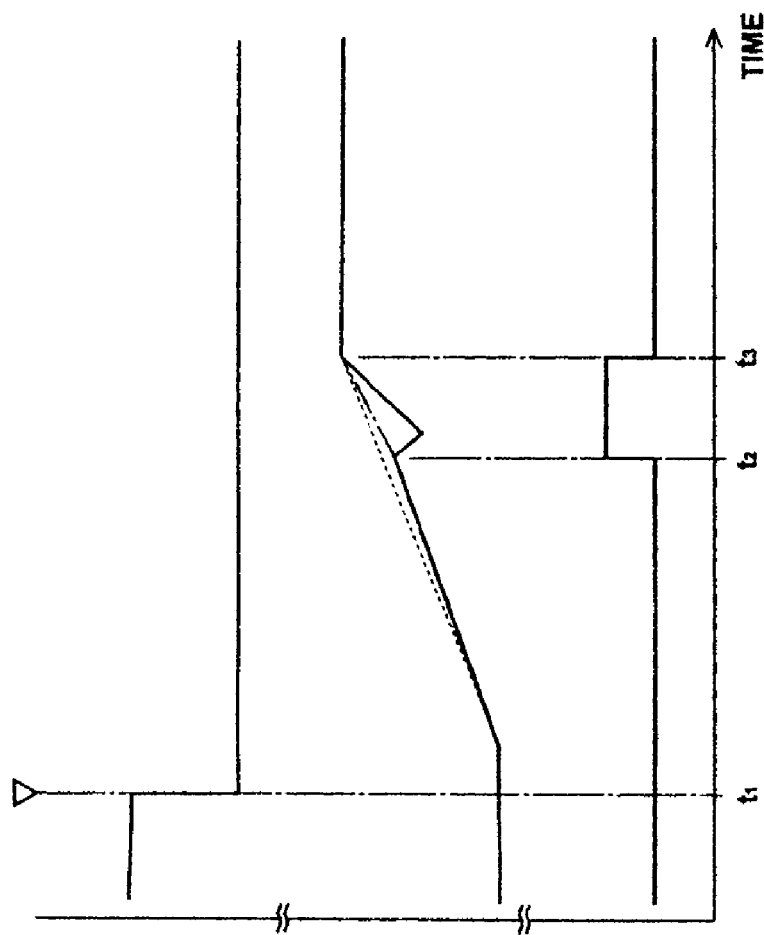
FIG. 13A OUTPUT SHIFT COMMAND
FIG. 13B ENGINE SPEED Ne (rpm)
FIG. 13C RETARD REQUIRED

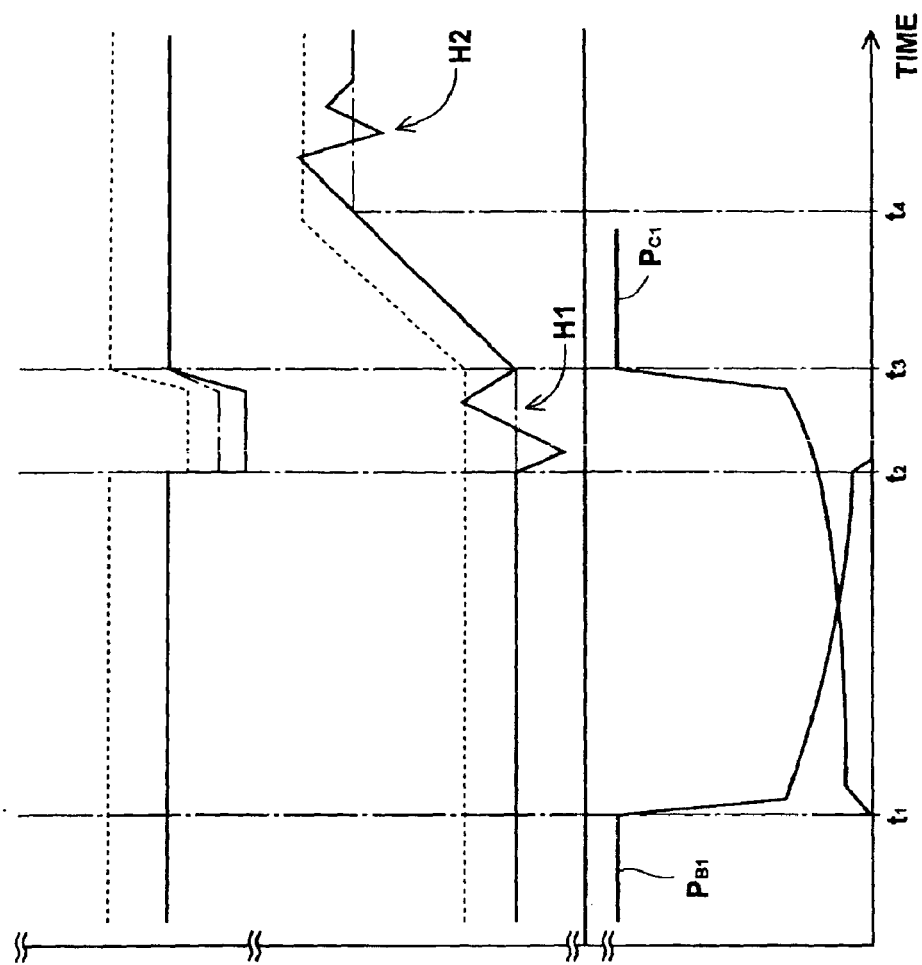
FIG. 13D IGNITION TIMING (DEGREE)
FIG. 13E TRANSMISSION OUTPUT SHAFT TORQUE $T_{OUT}$
FIG. 13F HYDRAULIC PRESSURE

APPARATUS AND METHOD FOR CONTROLLING IGNITION TIMING DURING SHIFT IN VEHICULAR AUTOMATIC TRANSMISSION

INCORPORATION BY REFERENCE

The disclosure of Japanese Patent Application No. 2002-284260 filed on Sep. 27, 2002, including the specification, drawings and abstract is incorporated herein by reference in its entirety.

BACKGROUND OF THE INVENTION

1. Field of the Invention

The invention relates to an apparatus and method for controlling ignition timing during a shift in a vehicular automatic transmission, which temporarily reduces an input torque to the automatic transmission according to a required retard amount during a shift of the automatic transmission.

2. Description of the Related Art

Art relating to an apparatus for controlling the ignition timing during a shift in a vehicular automatic transmission is known which is provided with a torque-down controller, which i) determines a retard amount required to temporarily reduce a torque input from an engine provided with an ignition timing retard controller to an automatic transmission (hereinafter, referred to as "input torque") based on an estimated input torque of the automatic transmission and a vehicle speed, and ii) temporarily reduces the input torque based on that determined retard amount during shifting of the automatic transmission. Because this type of control apparatus temporarily reduces the input torque to the automatic transmission during the shift period, shift shock is able to be preferably suppressed.

With this type of control apparatus, a preset relationship of the required retard amount with the estimated input torque of the automatic transmission and the vehicle speed is stored, and the retard amount corresponding with the actual estimated input torque and vehicle speed is determined in the same way. Therefore, if the output state of the engine changes due to a parameter other than the engine speed and a required load value used for calculating the estimated input torque, such as a throttle opening amount, an accelerator pedal operation amount, or an intake air quantity, shift shock is not able to be sufficiently reduced.

With respect to this, the following related art exists. This related art relates to a shift shock reducing apparatus for an automatic transmission, which is characterised in that it i) first calculates a difference between a shift time target value and an actual shift time, ii) determines a torque-down correction amount so as to eliminate that difference, and iii) sends a command to the engine to use the last torque-down amount corrected by the determined correction amount as the new torque down amount for the next shift. Because this shift shock reducing apparatus corrects the torque-down amount such that the actual shift time matches the shift time target value, shift shock is able to be preferably suppressed even if the input torque to the automatic transmission is affected by a change over time in the engine output characteristics or an external change such as a change in the fuel or air pressure or the like.

According to this shift shock reducing apparatus, however, because the torque-down correction amount is reflected in the next shift, it does not enable shift shock to be avoided during the first shift after the engine output characteristics change. Further, if the change in the engine output characteristics is large, shift shock will occur even if the torque-down correction amount is reflected in the next shift.

SUMMARY OF THE INVENTION

A first aspect of this invention relates to an apparatus for controlling ignition timing during a shift in a vehicular automatic transmission.

This control apparatus is provided with an ignition timing controller, a calculator, a detector, a determinator, and a corrector. The ignition timing controller controls an ignition timing retard amount. The calculator calculates a basic retard amount required to temporarily reduce an input torque to an automatic transmission in which the controller is provided. The detector detects an engine retard amount, i.e., a retard amount of an ignition timing required by the engine. The determinator determines a retard correction value based on a shift mode of the automatic transmission and an input torque related value of the automatic transmission. The corrector corrects the ignition timing retard amount of the controller based on the retard correction value determined by the determinator, the basic retard amount, and the engine retard amount.

Another aspect of the invention relates to a method for controlling ignition timing during a shift in a vehicular automatic transmission. This control method includes the steps of determining a basic retard amount, determining an engine retard amount, determining a retard correction value, calculating an ignition timing retard amount, and retarding the ignition timing in the engine. The retard correction value is determined based on the pre-stored relationship between the shift mode of the automatic transmission and the input torque related value of the automatic transmission. The ignition timing retard amount is calculated from the basic retard amount, the engine retard amount, and the retard correction value. The ignition timing in the engine is retarded based on the calculated value of the ignition timing retard amount.

According to the apparatus and method for controlling the ignition timing during a shift in a vehicular automatic transmission, the determinator determines the retard correction value based on the shift mode of the automatic transmission and the input torque related value of the automatic transmission. The corrector then corrects the ignition timing retard amount of the controller, including the basic retard amount and the engine retard amount, based on the determined retard correction value. Correcting the retard amount of the ignition timing in this way enables shift shock to be preferably suppressed.

That is, because the engine retard amount or the ignition timing retard amount of the controller which includes that ignition timing retard amount is corrected, the ignition timing retard amount which corresponds to a change in the input torque to the automatic transmission is able to be corrected appropriately even if the input torque to the automatic transmission is affected by a change over time in the engine output characteristics or an external change such as a change in the fuel or air pressure or the like.

BRIEF DESCRIPTION OF THE DRAWINGS

The foregoing and further objects, features, advantages, technical and industrial significance of this invention will be better understood by reading the following detailed description of the exemplary embodiments of the invention, when considered in connection with the accompanying drawings, in which:

FIG. 2 is a clutch application chart illustrating the application and release of clutches and brakes for achieving predetermined gear speeds in the automatic transmission shown in FIG. 1;

FIG. 11 is a chart showing the pre-stored relationship between retard correction value, vehicle speed, and shift mode, used by a determinator shown in FIG. 8 for determining a retard correction value;

FIG. 13A is a time chart illustrating changes during shifting in shift command output, which comprises a main portion of a control operation of the electronic control unit shown in FIG. 3;

FIG. 13B is a time chart illustrating changes during shifting in engine speed, which comprises a main portion of a control operation of the electronic control unit shown in FIG. 3;

FIG. 13C is a time chart illustrating changes during shifting in retard requirement, which comprises a main portion of a control operation of the electronic control unit shown in FIG. 3;

FIG. 13D is a time chart illustrating changes during shifting in ignition timing, which comprises a main portion of a control operation of the electronic control unit shown in FIG. 3;

FIG. 13E is a time chart illustrating changes during shifting in output shaft torque, which comprises a main portion of a control operation of the electronic control unit shown in FIG. 3; and FIG. 13F is a time chart illustrating changes during shifting in hydraulic pressure, which comprises a main portion of a control operation of the electronic control unit shown in FIG. 3.

DETAILED DESCRIPTION OF THE PREFERRED EMBODIMENTS

In the following description and the accompanying drawings, the present invention will be described in more detail in terms of an exemplary embodiment.

A first exemplary embodiment will hereinafter be described.

Figure 1:
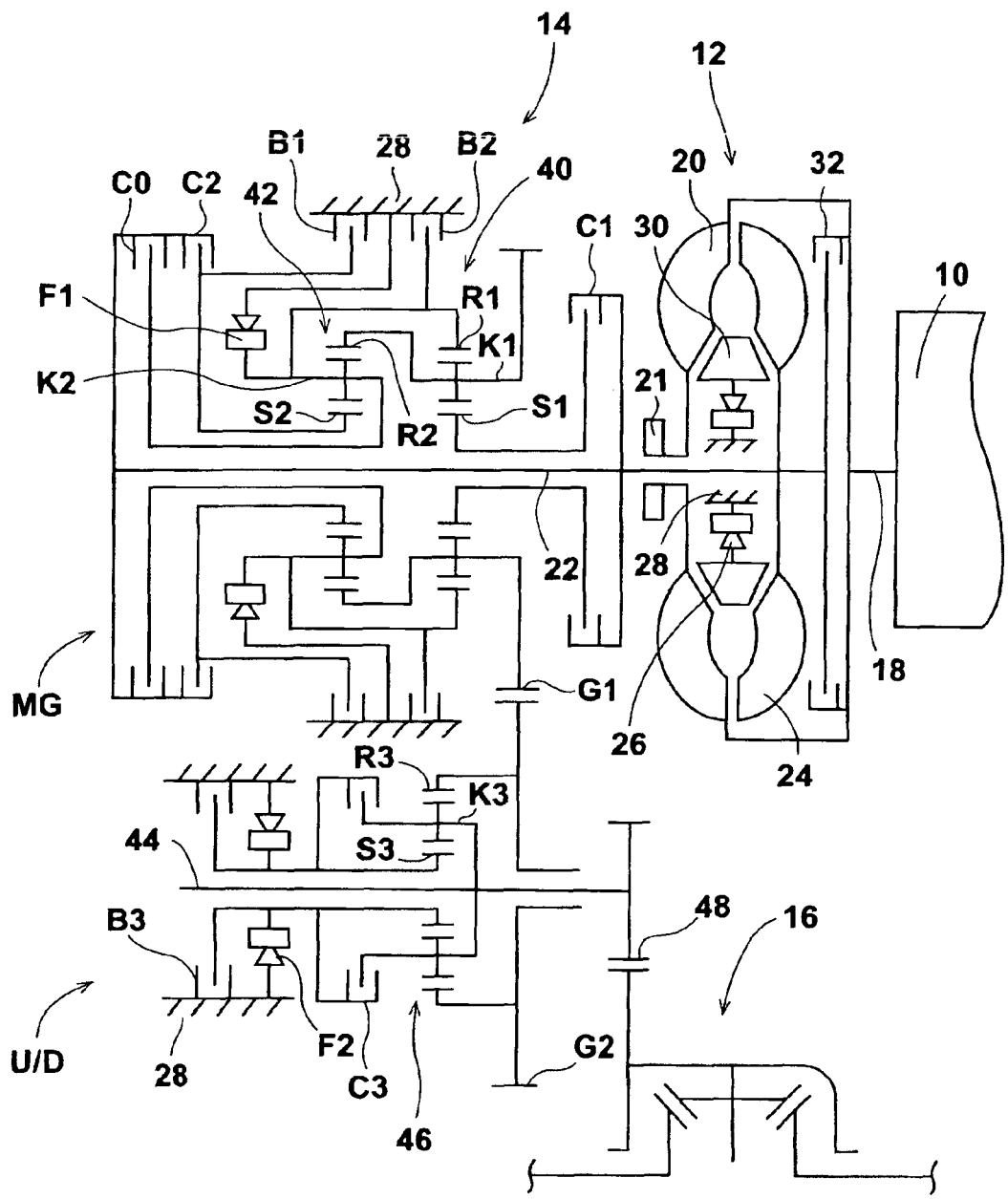
FIG. 1 is a skeleton view illustrating the configuration of a vehicular automatic transmission to which an apparatus for controlling ignition timing during a shift according to one exemplary embodiment of this invention has been applied.

FIG. 1 is a skeleton view of a transverse mounted vehicular driving apparatus for use in a FF (front engine-front drive) vehicle or the like. With this driving apparatus, output from an engine 10, which is an internal combustion engine such as a gasoline engine, is transmitted to driven wheels (front wheels) via power transmitting devices such as a torque converter 12, an automatic transmission 14, and a differential gear unit 16. The torque converter 12 includes a pump impeller 20 which is coupled to a crankshaft 18 of the engine 10, a turbine impeller 24 which is coupled to an input shaft 22 of the automatic transmission 14, a stator 30 which is fixed via a one-way clutch 26 to a housing 28, which is a non-rotatable member, and a lock-up clutch 32 which directly connects the crankshaft 18 to the input shaft 22 via a damper, not shown. To the pump impeller 20 is coupled a mechanical type oil pump 21, such as a gear pump. This oil pump 21 is driven, together with the pump impeller 20, by driving the engine 10 so as to generate hydraulic pressure for shifting and lubrication. The engine 10 is source for driving force for driving the vehicle. The torque converter 12 is a fluid coupling.

The automatic transmission 14 is mounted on the same axis as the input shaft 22. The automatic transmission 14 includes a first planetary gearset 40, a second planetary gearset 42, a third planetary gearset 46, and an output gear 48. The first planetary gearset 40 and the second planetary gearset 42 are single pinion type planetary gearsets with a so-called "CR—CR connection", in which the carrier and ring gear of one of the planetary gearsets are connected to the carrier and ring gear of the other planetary gearset, respectively. The third planetary gearset 46 is mounted on the same axis as a counter shaft 44, which is parallel to the input shaft 22. The output gear 48 is fixed to one end of the counter shaft 44 and engages with a differential gear unit 16. The first planetary gearset 40, second planetary gearset 42, and third planetary gearset 46 are each provided with a sun gear, a ring gear, and a carrier which rotatably supports planetary gears that are meshed with the sun gear and the ring gear. The sun gear, ring gear, and carrier are either selectively coupled together by four clutches C0, C1, C2, and C3, or selectively coupled to the housing 28, which is a non-rotatable member, by three brakes B1, B2, and B3. Also, the sun gear, ring gear, and carrier are coupled together or to the housing 28 via two one-way clutches F1 and F2, depending on the direction of rotation. The differential gear unit 16 is actually symmetrical with respect to the axis (i.e., the axle), so the lower half of the differential gear unit 16 is omitted in FIG. 1.

A primary transmitting portion MG capable of achieving five forward speeds and one reverse speed includes the first planetary gearset 40, the second planetary gearset 42, the clutches C0, C1, and C2, the brakes B1 and B2, and the one-way clutch F1, all of which are mounted on the same axis as the input shaft 22. An underdrive portion U/D, which is a secondary transmitting portion, includes the third planetary gearset 46, the clutch C3, the brake B3, and the one-way clutch F2, all of which are mounted on the same axis as the counter shaft 44. In the primary transmitting portion MG, the input shaft 22 is coupled to a carrier K2 of the second planetary gearset 42 via the clutch C0, a sun gear S1 of the first planetary gearset 40 via the clutch C1, and a sun gear S2 of the second planetary gearset 42 via the clutch C2. A ring gear R1 of the first planetary gearset 40 is connected to the carrier K2 of the second planetary gearset 42, and a ring gear R2 of the second planetary gearset 42 is connected to a carrier K1 of the first planetary gearset 40. The sun gear S2 of the second planetary gearset 42 is coupled to the housing 28 via the brake B1. The ring gear R1 of the first planetary gearset 40 is coupled to the housing 28 via the brake B2. The one-way clutch F1 is provided between the carrier K2 of the second planetary gearset 42 and the housing 28. A first counter gear G1, which is fixed to the carrier K1 of the first planetary gearset 40, is meshed with a second counter gear G2, which is fixed to a ring gear R3 of the third planetary gearset 46. In the underdrive portion U/D, a carrier K3 and a sun gear S3 of the third planetary gearset 46 are coupled together via the clutch C3. Also in the underdrive portion U/D, the brake B3 and the one-way clutch F2 are provided in parallel between the sun gear 53 and the housing 28.

The clutches C0, C1, C2, and C3 and the brakes B1, B2, B3 (hereinafter simply referred to as "clutches C" and brakes B", respectively, when not specified further) are hydraulic pressure type friction engaging devices which are applied by hydraulic actuators such as multi-disc clutches or band brakes. These clutches C and brakes B are switched between an applied state and a released state, as shown in FIG. 2, for example, by switching solenoids S1 to S4 and linear solenoids SL1, SL2, and SLU of a hydraulic pressure control circuit 98 between an energized state and a de-energized state, or by switching a hydraulic circuit using a manual valve, not shown. Each speed, i.e., the five forward speeds, one reverse speed, and a neutral speed, is achieved according to a position of a shift lever 72 (see FIGS. 3 and 4). The denotations "1 st" to "5th" in FIG. 2 denote the first forward speed to the fifth forward speed, respectively. The single circle indicates application of the clutches C and the brakes B. The "X" indicates release of the clutches C and the brakes B. The triangle indicates application of the clutches C and the brakes B only during driving. The shift lever 72 is operated in a shift pattern which includes a park position "P", a reverse drive position "R", a neutral position "N", and forward drive positions "D", "4", "3", "2", and "L", as shown in FIG. 4, for example. When the shift lever 72 is in the "P" or the "N" position, the transmission is in a neutral speed, i.e., a non-drive speed, in which the transmission of power is interrupted. When the shift lever 72 is in the "P" position, the driven wheels are mechanically prevented from rotating by a mechanical parking mechanism, not shown. Also, the five forward speeds and the one reverse speed achieved when the shift lever 72 is in any one of the forward drive positions, such as the "D" position, or the "R" position, respectively, correspond to driving speeds. Further, as shown in FIG. 2, a shift between second speed and third speed is a clutch-to-clutch or synchronous shift, in which the clutch C0 is applied at the same time the brake B1 is released, or vice versa. Similarly, a shift between third speed and fourth speed is a clutch-to-clutch shift in which the clutch C1 is applied at the same time the brake B1 is released, or vice versa. In the above-mentioned hydraulic pressure frictional engaging device, a line pressure regulated by a turbine torque $T_T$, i.e., an input torque $T_{IN}$ to the automatic transmission 14 or a throttle opening amount $\theta_{TH}$ which is a value representative thereof, is used as the base pressure.

Figure 3:
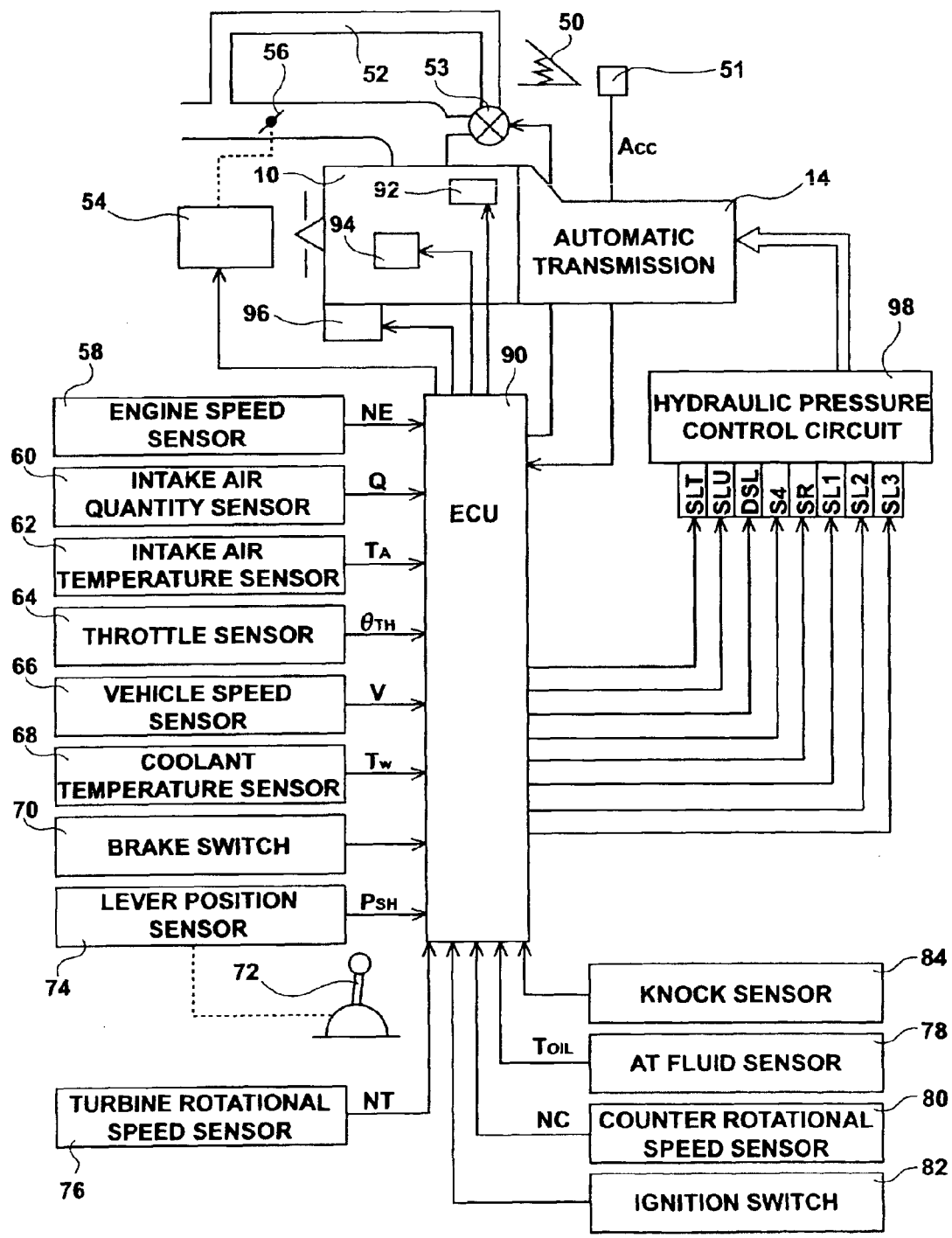
FIG. 3 is a block diagram illustrating a control system that controls the engine and automatic transmission and the like shown in FIG. 1.
Figure 4:
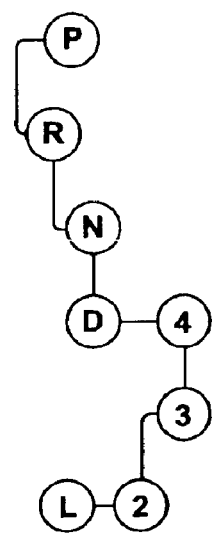
FIG. 4 is a view illustrating one example of a shift pattern of a shift lever shown in FIG. 3.
Figure 5:
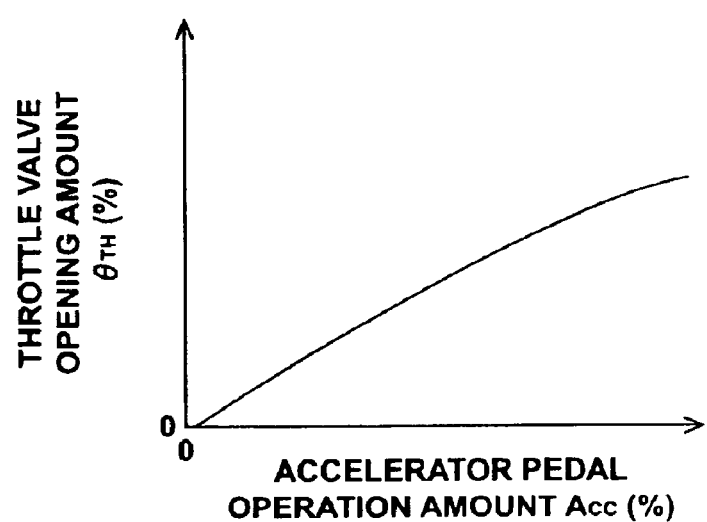
FIG. 5 is a graph showing one example of the relationship between an accelerator pedal operation amount Acc and a throttle valve opening amount $\theta_{TH}$ used in throttle control performed by an electronic control unit shown in FIG. 3.

FIG. 3 is a block diagram illustrating a control system provided in a vehicle for controlling the engine 10 and automatic transmission 14 and the like shown in FIG. 1. In this control system, the operation amount (accelerator opening amount) Acc of an accelerator pedal 50 is detected by an accelerator operation amount sensor 51. This accelerator pedal 50 corresponds to an accelerator operating member and can be depressed to a large degree depending on the amount of output required by a driver. Further, the accelerator pedal operation amount Acc corresponds to the amount of required output. An electronic throttle valve 56 is provided in an intake pipe of the engine 10. The opening amount of this electronic throttle valve 56 changes upon receiving a command corresponding to the accelerator pedal operation amount Acc from a throttle actuator 54, according to the pre-stored relationship between the accelerator pedal operation amount Acc and the throttle value opening $\theta_{TH}$ (%), shown in FIG. 5. This relationship is set such that the throttle opening amount $\theta_{TH}$ increases as the accelerator pedal operation amount Acc becomes larger. Also, a bypass passage 52 which bypasses the electronic throttle valve 56 is provided to control the idle speed. In this bypass passage 52 is provided an ISC (idle speed control) valve 53 that controls the intake air quantity when the electronic throttle valve 56 is fully closed. This ISC valve 53 controls an idle speed $NE_{IDL}$ of the engine 10. In addition, other sensors and switches are also provided, such as an engine speed sensor 58 for detecting an engine speed $N_E$ of the engine 10, an intake air quantity sensor 60 for detecting an intake air quantity Q of the engine 10, an intake air temperature sensor 62 for detecting a temperature $T_A$ of the intake air, a throttle sensor 64 with an idle switch for detecting when the electronic throttle valve 56 is fully closed (i.e., when the engine 10 is in an idle state) and an opening amount $\theta_{TH}$ of that electronic throttle valve 56, a vehicle speed sensor 66 for detecting a rotational speed $N_{OUT}$ of the counter shaft 44 which corresponds to the vehicle speed V, a coolant temperature sensor 68 for detecting an engine coolant temperature $T_W$ of the engine 10, and a brake switch 70 for detecting whether a foot brake is being operated. In addition, other sensors and switches include a lever position sensor 74 for detecting a lever position (i.e., operating position) $P_{SH}$ of the shift lever 72, a turbine rotational speed sensor 76 for detecting a turbine rotational speed NT (=rotational speed $N_{IN}$ of the input shaft input shaft 22), an AT fluid sensor 78 for detecting an AT fluid temperature $T_{OIL}$, which is the temperature of the hydraulic fluid within the hydraulic pressure control circuit 98, a counter rotational speed sensor 80 for detecting a rotational speed NC of the first counter gear G1, an ignition switch 82, and a knock sensor 84. Signals from these sensors indicative of the engine speed $N_E$, intake air quantity Q, intake air temperature $T_A$, throttle valve opening amount $\theta_{TH}$, vehicle speed V, engine coolant temperature $T_W$, a brake operation, lever position $P_{SH}$ of the shift lever 72, turbine rotation speed NT, AT fluid temperature $T_{OIL}$, counter rotational speed NC, the operational position of the ignition switch 82, and knocking of the engine 10, and the like are supplied to an electronic control unit (ECU) 90. The brake switch 70 is an ON-OFF switch that switches the brake ON and OFF depending on whether the brake pedal, which operates a main brake, is depressed or not.

The ECU 90 includes a microcomputer that has a CPU, RAM, ROM, an input/output interface and the like. The CPU executes output control of the engine 10 and shift control of the automatic transmission 14 and the like by using the temporary storage function of the RAM and processing the signals according to a program stored in the ROM beforehand. If necessary, the CPU may be configured such that a portion thereof for engine control is separate from a portion thereof for shift control. Output control of the engine 10 includes controlling the opening and closing of the electronic throttle valve 56 using the throttle actuator 54, controlling a fuel injection valve 92 for fuel injection quantity control, controlling an ignition device 94, such as an igniter, for ignition timing control, and controlling the ISC valve 53 for idle speed control. The electronic throttle valve 56 is controlled by, for example, driving the throttle actuator 54 based on the actual accelerator pedal operation amount Acc according to the relationship between the accelerator pedal operation amount Acc and the throttle valve opening amount $\theta_{TH}$, shown in FIG. 5 for example, and increasing the throttle valve opening amount $\theta_{TH}$ as the accelerator pedal operation amount Acc increases. When the engine 10 is started, the crankshaft 18 is cranked by a starter (electric motor) 96.

Figure 7:
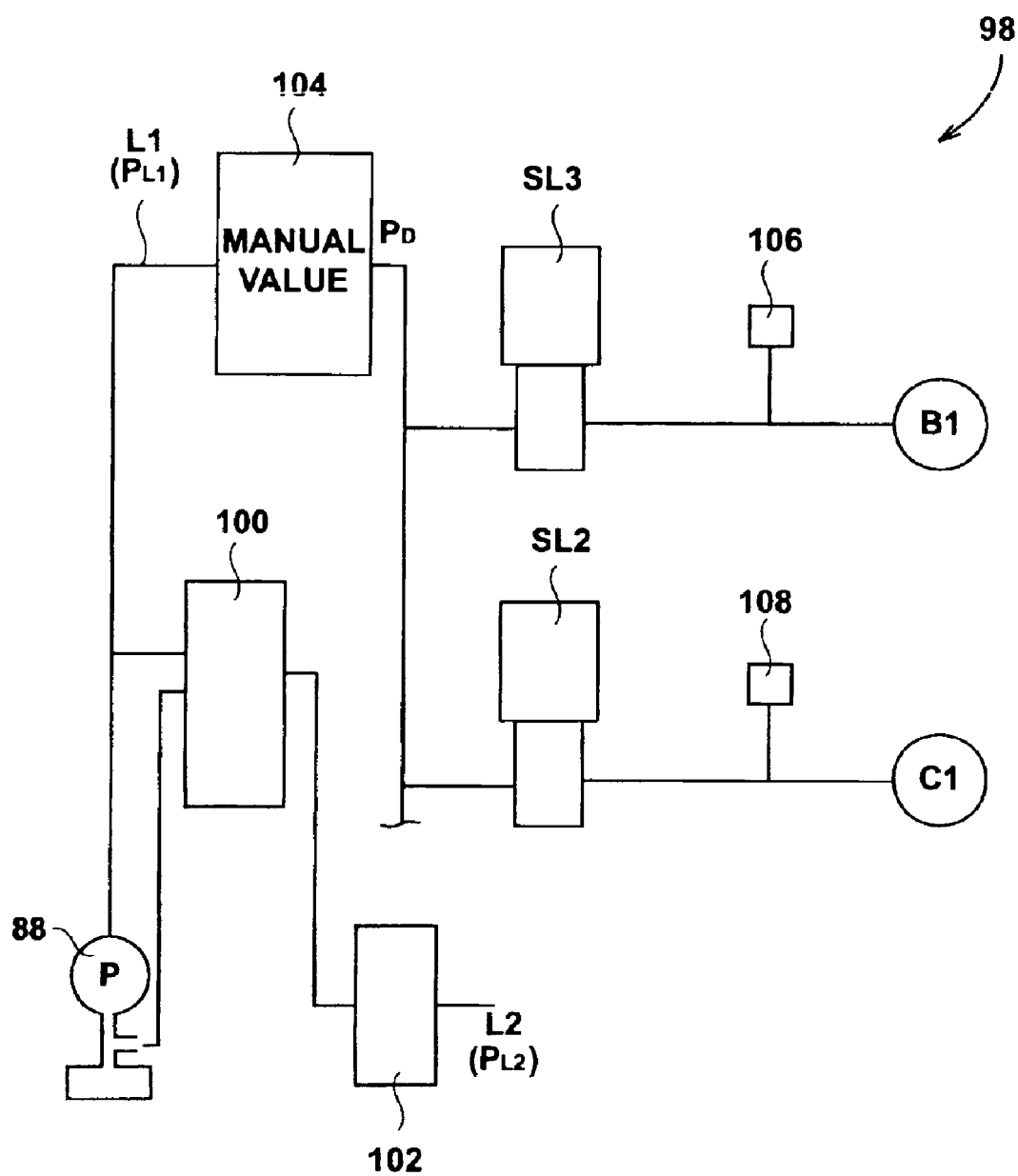
FIG. 7 is a view illustrating the configuration of main portions of a hydraulic pressure control circuit shown in FIG. 3.

FIG. 7 is a view showing the portions related to a 4→3 downshift, which make up the main portions of the hydraulic pressure control circuit 98. The hydraulic fluid fed under pressure from an oil pump 88 is adjusted to a first line hydraulic pressure $P_{L1}$ by a relief type first regulator valve 100. The hydraulic pressure flowing out from the first regulator valve 100 is then further adjusted to a second line hydraulic pressure $P_{L2}$ by a relief type second regulator valve 102. The first line hydraulic pressure $P_{L1}$ is supplied via a line L1 to a manual valve 104 which is interlocked with the shift lever 72. When the shift lever 72 is in the "D" position (range), the first line hydraulic pressure $P_{L1}$ and a forward drive position hydraulic pressure $P_D$, which is the same pressure as the first line hydraulic pressure $P_{L1}$, is supplied from the manual valve 104 to each of the solenoid valves SL1, SL2, SL3 and the like, and a shift valve, not shown. FIG. 7 shows the brake B1, which is released, and the clutch C1, which is applied, in order to achieve a 4→3 downshift, the solenoid valve SL3 which directly controls an engagement pressure $P_{B1}$ of the brake B1, the solenoid valve SL2 which directly controls an engagement pressure $P_{C1}$ of the clutch C1, a hydraulic pressure sensor 106 which is connected to the brake B1 for detecting the engagement pressure $P_{B1}$, and a hydraulic pressure sensor 108 which is connected to the clutch C1 for detecting the engagement pressure $P_{C1}$.

Figure 6:
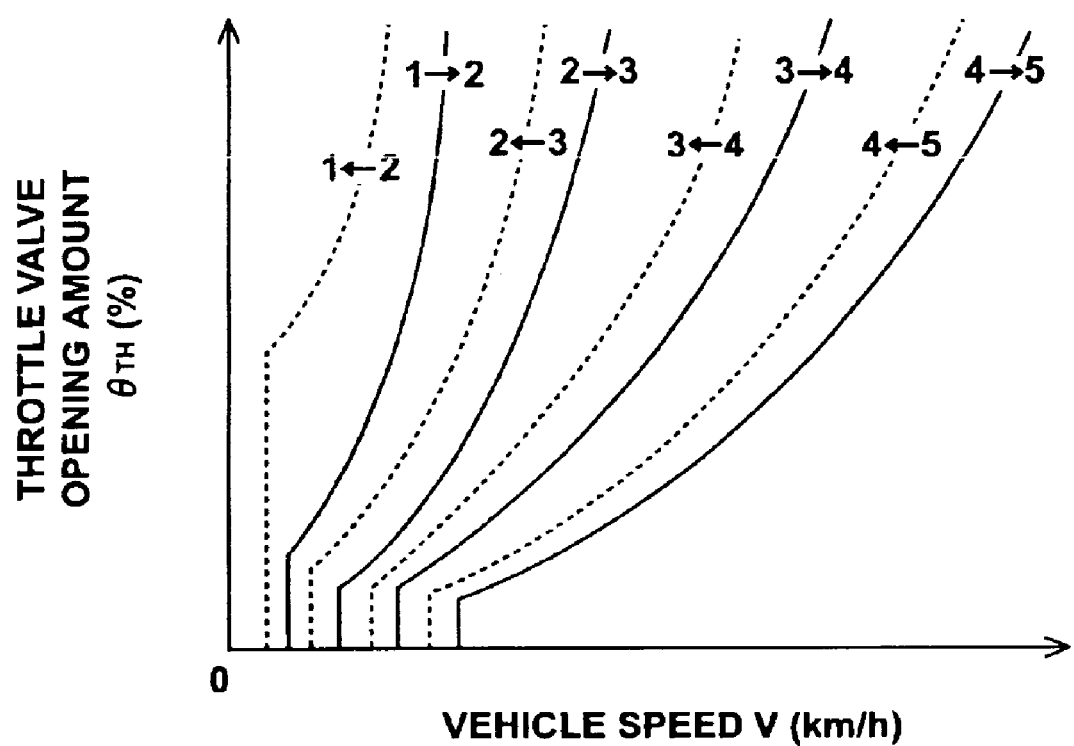
FIG. 6 is a view illustrating one example of a shift line graph (i.e., shift map) used in shift control of the automatic transmission performed by the electronic control unit shown in FIG. 3.
Figure 8:
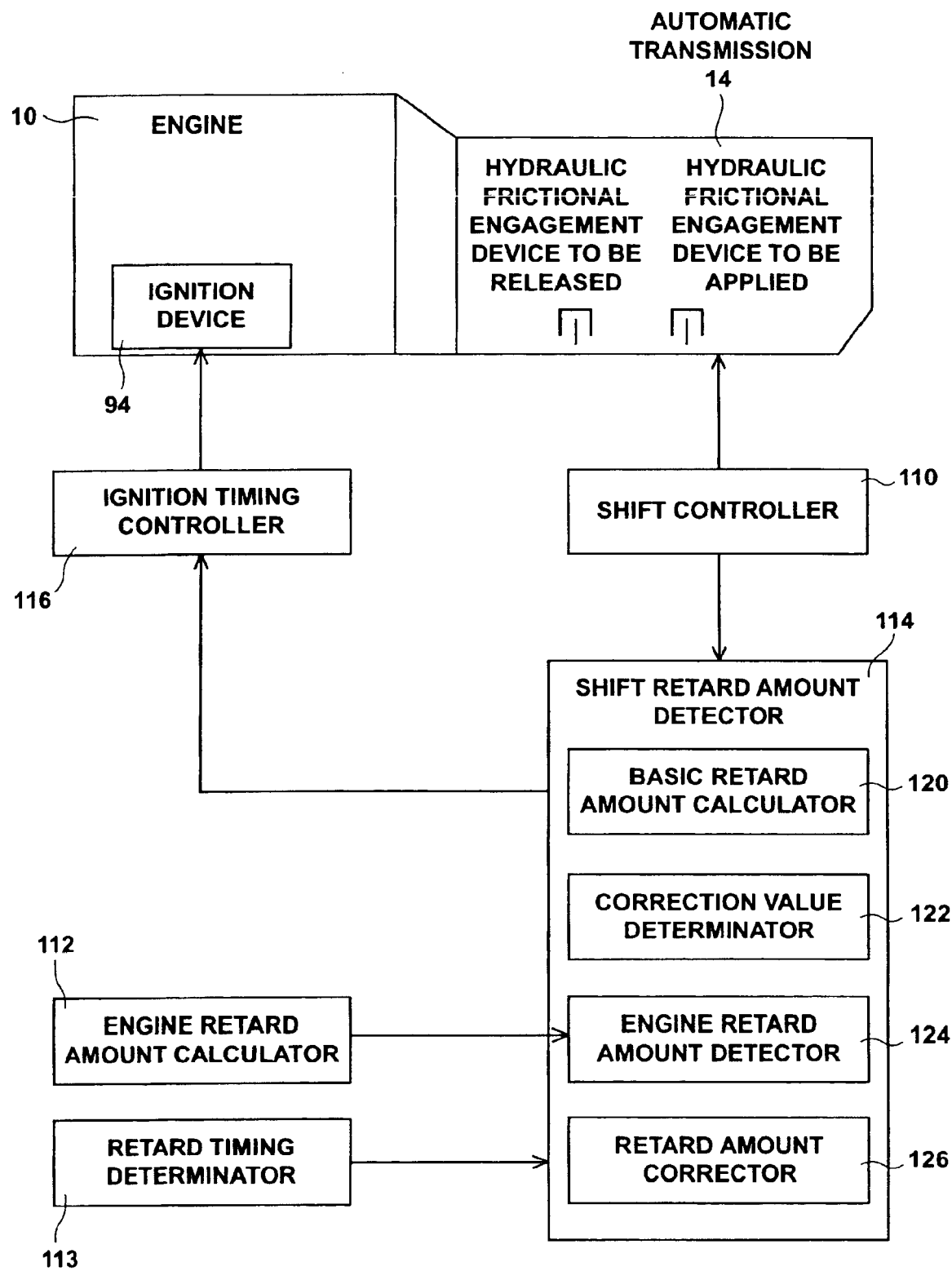
FIG. 8 is a block diagram illustrating ignition timing retard control functions during a shift, which comprise the main portions of the control functions of the electronic control unit shown in FIG. 3.

FIG. 8 is a functional block diagram illustrating the ignition timing control during a shift function, which constitutes the main portion of the control function of the ECU 90. A shift controller 110 shown in the drawing is operated as follows. First, for example, the shift controller 110 determines the speed into which the automatic transmission 14 should be shifted, i.e., executes a determination to shift from the current speed to the next speed, based on the actual throttle valve opening amount $\theta_{TH}$ and the vehicle speed V according to a shift line graph (i.e., shift map) shown in FIG. 6, which is stored in advance. Next, the shift controller 110 outputs a shift command which starts a shift operation to shift the automatic transmission 14 from the current speed to the determined speed. In addition, the shift controller 110 switches solenoids S4 and SR of the hydraulic pressure control circuit 98 ON (energized) and OFF (de-energized) and continually changes the energized state of the linear solenoids SL1, SL2, and SL3 and the like of the hydraulic pressure control circuit 98 by duty control or the like, so that shift shock due to a change in driving force does not occur and the durability of the friction members does not decrease. In FIG. 6, the solid lines are upshift lines and the broken lines are downshift lines. The automatic transmission 14 shifts to a speed on the low speed side having a large gear ratio (=input rotational speed $N_{IN}$/output rotational speed $N_{OUT}$) as the vehicle speed V decreases or the throttle valve opening amount $\theta_{TH}$ increases. The denotations "1" through "5" in the drawing refer to a first speed "1st" through a fifth speed "5th". Also, when a clutch-to-clutch shift, e.g., 4→3 downshift, is performed, the engagement pressure $P_{B1}$ of the brake B1, which is a hydraulic frictional engagement device to be released, decreases while the engagement pressure $P_{C1}$ of the clutch C1, which is a hydraulic frictional engagement device to be applied, increases. At this time, if the clutch C1 or the brake B1 is released before the other is applied, racing occurs in which the engine speed $N_E$ abruptly increases temporarily. On the other hand, if the clutch C1 or the brake B1 is applied before the other is released, tie-up occurs in which the engine speed $N_E$ abruptly decreases temporarily. Therefore, the engagement hydraulic pressure $P_{C1}$ and/or $P_{B1}$ is set according to the input torque $T_{IN}$ to the automatic transmission 14 so that the temporary abrupt increase in the engine speed $N_E$ and the temporary abrupt decrease in the output shaft torque $T_{OUT}$ is reduced irrespective of the input torque. Further, the engagement hydraulic pressure $P_{C1}$ and/or $P_{B1}$ is corrected by feedback control or learning control such that racing or tie-up is equal to, or less than, a predetermined value.

An engine retard amount calculator 112 successively calculates a retard amount required by conditions of the engine 10, for example, retard learning value A necessary for suppressing knocking of the engine 10, based on a knocking signal from a formula set beforehand, and stores it corresponding to the engine speed $N_E$ at that time. This retard learning value A is conventionally used in a knocking suppression control device for retarding the ignition timing of the engine 10 from a basic ignition timing in order to prevent knocking. A retard timing determinator 113 determines a change start timing of the output shaft torque $T_{OUT}$ in the shift period, e.g., an engaging shock start timing of the clutch C1 which is a hydraulic frictional engaging device to be engaged in a 4→3 downshift. This determination is made based, for example, on whether the engine speed $N_E$ has reached a previously set determination value which is less, by a predetermined value of approximately several hundred rpm, for example, than the engine speed after the shift, or whether the time passed after the shift command has been output has exceeded a previously set determination time.

An in-shift retard amount detector 114 operates as follows. First, the detector 114 detects the retard correction value, e.g., the correction coefficient K, based on the input torque related value, e.g., the vehicle speed V, which reflects the input torque $T_{IN}$ to the automatic transmission 14, and the shift mode of the automatic transmission 14, e.g., a shifting speed which is a speed into which the automatic transmission 14 will be shifted or the type of shift which indicates the speed into which the automatic transmission 14 will be shifted. Next, the in-shift retard amount detector 114 determines the ignition timing retard amount D based on the correction coefficient K, the retard learning value A, and a basic retard amount B on the shift side for suppressing shift shock during a shift, such as a 4→3 downshift. Then the in-shift retard amount detector 114 outputs the ignition timing retard amount D to the ignition timing controller 116 at the point when the output shaft torque $T_{OUT}$ will change as determined by the retard timing determinator 113. The ignition timing controller 116 then issues a command to retard the ignition timing of the engine 10 from the basic ignition timing by the ignition timing retard amount D to temporarily reduce the input torque $T_{IN}$. The ignition device 94 and the ignition timing controller 116 both serve as ignition timing controllers for controlling the ignition timing of the engine 10.

The in-shift retard amount detector 114 is provided with a basic retard amount calculator (hereinafter referred to as "calculator") 120, a correction value determinator 122, an engine retard amount detector 124, and a retard amount corrector (hereinafter referred to as "corrector") 126. The calculator 120 calculates the basic retard amount B similarly to the determination of the required retard amount during shifting in conventional retard control, e.g., based on the actual vehicle speed V and the input torque $T_{IN}$ to the automatic transmission 14 from the pre-stored relationship (map) between the basic retard amount, vehicle speed, and input torque $T_{IN}$ shown in FIG. 9. This relationship is obtained experimentally beforehand in order to suppress shift shock. Because the input torque $T_{IN}$ is calculated based on required load values, such as the throttle opening amount, the accelerator pedal operation amount, and the intake air quantity, and the engine speed $N_E$ from a pre-stored torque calculation map shown in FIG. 10, effects from changes over time in the output characteristics of the engine 10 and external changes, such as changes in fuel and air pressure and the like, are not included.

The correction value determinator 122 determines the correction value, i.e., the correction coefficient K, based on the actual shift speed and the vehicle speed V (input torque related value) from the pre-stored relationship (map) between the retard correction value, the vehicle speed, and the shift mode, shown in FIG. 11, for example. This relationship is obtained experimentally beforehand in order to retard the ignition timing of the engine 10 by a retard amount that takes into account effects from changes over time in the output characteristics of the engine 10 with respect to the input torque $T_{IN}$ and external changes, such as changes in fuel and air pressure and the like, during shifting.

The engine retard amount detector 124 detects the retard learning value A that was successively calculated by the engine retard amount calculator 112 in order to suppress knocking of the engine 10. The corrector 126 calculates the ignition timing retard amount D based on the actual correction coefficient K, the retard learning value A, and the basic retard amount B on the shift side for suppressing shift shock during shifting from Expression (1), which has been pre-stored.

$$D = K \times A + B \quad (1)$$

Figure 12:
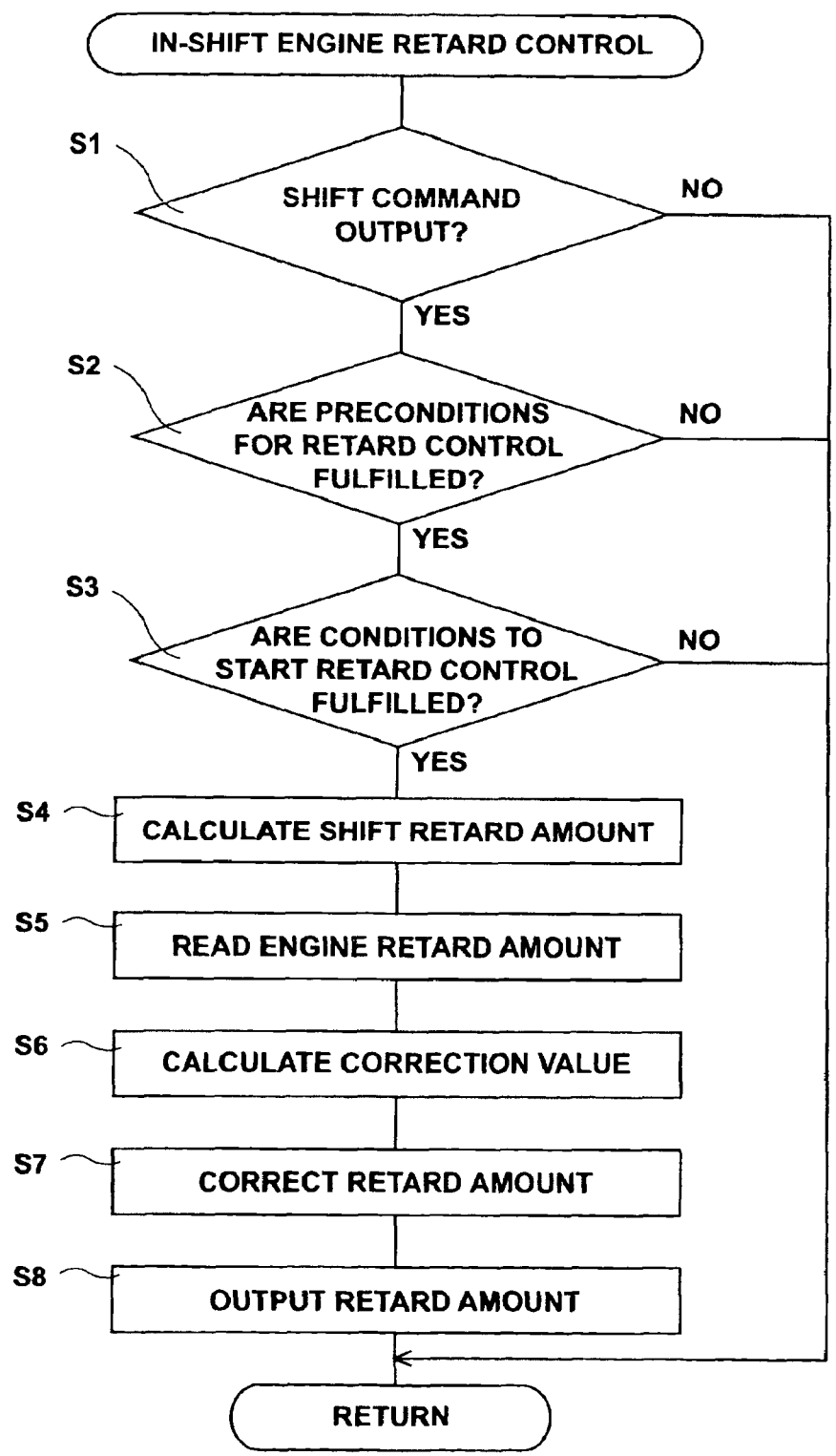
FIG. 12 is a flowchart illustrating activation of operation of ignition timing retard control during a shift, which comprises a main portion of a control operation of the electronic control unit shown in FIG. 3.

FIG. 12 is a flowchart illustrating activation of ignition timing retard control operation during a clutch-to-clutch downshift, which comprises the main portion of the control operation of the ECU 90. In step S1 in FIG. 12, it is determined whether a shift command has been output, e.g., a 4→3 downshift command has been output, based on a signal sent from the shift controller 110. When the determination in step S1 is NO, the routine ends. When the determination is YES, it is determined in step S2 whether preconditions for retard control have been fulfilled, e.g., whether the engine 10 is warmed up to the point where the coolant temperature is equal to, or greater than, a predetermined value, whether the automatic transmission 14 is warmed up to the point where the hydraulic fluid temperature is equal to, or greater than, a predetermined temperature, and whether all of the sensors are operating normally. If the determination in step S2 is NO, the routine ends. If the determination is YES, however, the timing at which the output shaft torque $T_{OUT}$ starts to change due to application of the clutch C1 in a 4→3 downshift, for example, i.e., the timing at which shock from application of the clutch C1 which is a hydraulic fractional engaging device to be applied starts, is determined in step S3, which corresponds to the determinator 113. This determination is made based on whether engine speed $N_E$ has reached a previously set determination value which is less, by a predetermined value of approximately several hundred rpm, for example, than the engine speed $N_E$ after the shift, or whether the time passed after the shift command has been output has exceeded a previously set determination time.

If the determination in step S3 is NO, the routine ends. If that determination is YES, however, the basic retard amount B is calculated in step S4, which corresponds to the calculator 120, based on the actual vehicle speed V and the input torque $T_{IN}$ to the automatic transmission 14 according to the pre-stored relationship (map) between the basic retard amount, the vehicle speed, and the input torque, shown in FIG. 9, for example. This input torque $T_{IN}$ is calculated based on, for example, the actual engine speed $N_E$ and the throttle valve opening amount θ according to the relationship between the engine speed $N_E$, the engine output torque $T_E$ (input torque $T_{IN}$), and the throttle opening amount θ, shown in FIG. 10. Next in step S5, which corresponds to the engine retard amount detector 124, the engine retard learning value A, which was successively calculated by the engine retard amount calculator 112 in order to suppress knocking of the engine 10, is read. Then in step S6, which corresponds to the correction value determinator 122, the correction value, i.e., the correction coefficient K, is determined based on the actual shift speed and the vehicle speed V (input torque related value) according to, for example, the pre-stored relationship (map) between the retard correction value, the vehicle speed, and the shift mode, shown in FIG. 11. Next in step S7, which corresponds to the corrector 126, the ignition timing retard amount D is calculated based on the actual correction coefficient K, the retard learning value A, and the basic retard amount B on the shift side for suppressing shift shock during shifting according to Expression (1) that was stored beforehand. Then in step S8, the ignition timing retard amount D calculated in step S7 is output to the ignition timing controller 116 and the engine 10 is operated with the ignition timing being retarded from the basic ignition timing by the ignition timing retard amount D.

FIG. 13 is a time chart illustrating operation of the ECU 90. The broken lines in FIGS. 13B, D, and E indicate a case in which no retard learning value A for knocking suppression is generated. Accordingly, the position of the broken line in the ignition timing in FIG. 13D indicates the basic ignition timing of the engine 10. Also, in FIGS. 13B, D, and E, the single dashed line shows the exemplary embodiment when the retard learning value A is generated, and the solid line shows a conventional example when the retard learning value A is generated. With respect to the solid line, a change H1 that occurs in the interval between time $t_2$ and time $t_3$, from among the changes in the output shaft torque $T_{OUT}$ shown in FIG. 13E, indicates tie-up shock, in which the clutch C1 is applied early due to a lack of input torque $T_{IN}$ resulting from a change over time in the output characteristics of the engine 10 or external changes, such as changes in the fuel or air pressure. The change H2, which occurs after time $t_4$, indicates shock due to temporary racing of the engine 10.

As shown in FIGS. 13B and F, for example, which a command is output for a 4→3 shift (time $t_1$) according to a predetermined amount of depression of the accelerator pedal 50 while running, the brake B1 starts to be released as the engagement hydraulic pressure $P_{B1}$ of that brake B1 decreases. Almost simultaneously, the engagement hydraulic pressure $P_{C1}$ of the clutch C1 starts to increase so that the engine speed $N_E$ constantly increases. Next, when the timing at which the output shaft torque $T_{OUT}$ starts to change due to application of the clutch C1 is determined based on the engine speed $N_E$ (time $t_2$), the ignition timing retard amount D calculated by the in-shift retard amount detector 114 is output to the ignition timing controller 116 during the interval from time $t_2$ to time $t_3$. Based on this output value, the engine 10 is then operated with the ignition timing being retarded from the basic ignition timing by the ignition timing retard amount D. Accordingly, a change in the output torque $T_{OUT}$ is able to be preferably suppressed as shown by the single dashed line.

As described above, according to this exemplary embodiment, the correction value determinator 122 (step S6) determines the retard correction value K based, for example, on the shift mode of the automatic transmission 14 and the input torque related value (vehicle speed V) relating to the input torque to the automatic transmission 14 according to the pre-stored relationship between the retard correction value, the vehicle speed, and the shift mode shown in FIG. 11. Then the corrector 126 (step S7) corrects the ignition timing retard amount D of the ignition timing controller 116 based on the retard correction value K determined by the correction value determinator 122, the base require retard amount B, and the engine retard amount A. Accordingly, it is possible to preferably suppress the occurrence of shift shock. That is, because the engine retard amount A or the ignition timing retard amount D of the controller which includes that engine retard amount A is corrected, the ignition timing retard amount corresponding to a change in the input torque of the automatic transmission, should a change occur, is able to be corrected appropriately even if the input torque of the automatic transmission is affected by a change, over time, in the engine output characteristics or an external change such as a change in the fuel or air pressure or the like.

Figures 9, 10:
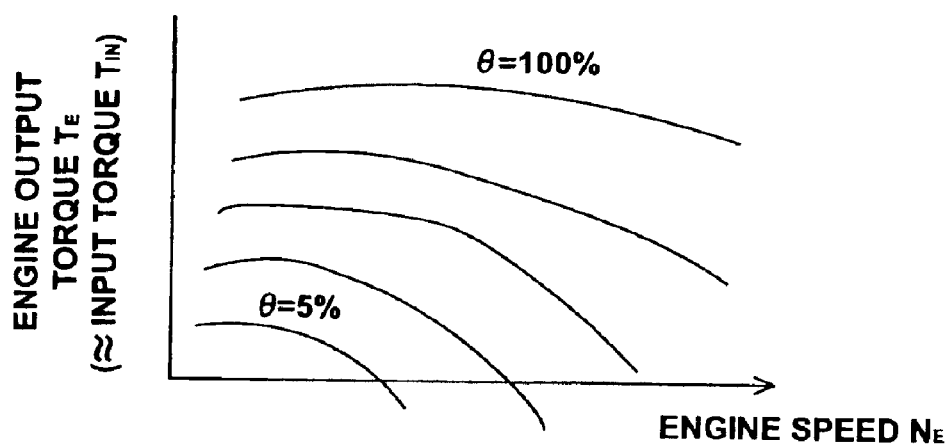
FIG. 9 is a chart showing the pre-stored relationship between a basic retard amount, a vehicle speed, and an input torque used by a calculator shown in FIG. 8 for calculating the basic retard amount.
FIG. 10 is a graph showing the pre-stored relationship between an engine speed, an engine output torque (i.e., input torque), and a throttle opening amount used by the calculator shown in FIG. 8 for estimating an input torque.

Also according to this exemplary embodiment, because the basic retard amount B is a value that is determined based, for example, on the input torque $T_{IN}$ or a parameter relating thereto, and the vehicle speed according to the pre-stored relationship between the basic retard amount, the vehicle speed, and the input torque shown in FIG. 9, an appropriate basic retard amount B required to suppress shift shock can be obtained in accordance with the change in the input torque $T_{IN}$ to the automatic transmission 14 and the vehicle speed V.

Also according to the exemplary embodiment, because the engine retard amount A is a value that is determined by learning for each engine speed in order to suppress knocking in the engine 10, an appropriate engine retard amount A required to suppress knocking in the engine 10 with high precision can be obtained.

Further, according to the exemplary embodiment, because the input torque related value is the vehicle speed V and the correction value determinator 122 (step S6) determines the retard correction value K based on, for example, the actual shift mode of the automatic transmission 14 and the vehicle speed V according to the relationship between the pre-set retard correction value K, the vehicle speed, and the shift mode shown in FIG. 11, an appropriate retard correction value K required to suppress shift shock can be obtained in accordance with the change in the shift mode of the automatic transmission 14 and the vehicle speed relating to the input torque.

Also according to the exemplary embodiment, because the retard correction value K is a correction coefficient smaller than 1 and the corrector 126 (step S7) corrects the ignition timing retard amount D by multiplying the retard correction value K by the engine retard amount A, shift shock is able to be preferably suppressed even if the input torque $T_{IN}$ to the automatic transmission 14 is affected by a change, over time, in the engine output characteristics or an external change such as a change in the fuel or air pressure or the like.

Although the invention has been described herein with reference to specific embodiments, many modifications and variations therein will readily occur to those skilled in the art.

For example, in the foregoing exemplary embodiment, a 4→3 downshift is described as the shift mode, wherein the basic retard amount B is added to the product of the retard correction value K and the engine retard amount A, and the engine 10 is controlled such that the basic ignition timing is retarded using the obtained ignition timing retard amount D. Alternatively, however, the invention may also be applied to another shift mode, such as a 3→2 downshift, a 2→3 upshift, or a 3→4 upshift.

Further, in the foregoing exemplary embodiment, the vehicle speed V used as the input torque related value. Alternatively, however, the throttle opening amount θ, the intake air quantity of the engine 10, the fuel injection quantity of the engine 10, the accelerator pedal operation amount, or the like may also be used.

Also in the foregoing exemplary embodiment, the ignition timing retard amount D is corrected by multiplying the correction coefficient K, which is the retard correction value, by the engine retard amount A. Alternatively, however, the correction coefficient K may also be multiplied by the ignition timing retard amount D by changing the condition of setting the relationship between the retard correction value, the vehicle speed, and the shift mode in FIG. 11. Also, the correction coefficient K used as the retard correction value is less than 1 in the foregoing exemplary embodiment. Alternatively, however, a correction amount obtained by adding or subtracting the engine retard amount A or the ignition timing retard amount D which includes that engine retard amount A may also be used as the retard correction value.

Further, in the foregoing exemplary embodiment, the correction coefficient K, which is the retard correction coefficient, is determined based on the vehicle speed V and the shift mode according to the retard correction value, the vehicle speed, and the shift mode shown in FIG. 11. Alternatively, however, the invention is also effective when the correction coefficient K is determined based on only one of the vehicle speed V and the shift mode.

Further, the flowchart in FIG. 12 can be modified in various ways. For example, because step S3 is a condition for executing step S8, it may be placed anywhere within the flowchart as long as it is before step S8.

Also in the foregoing exemplary embodiment, the automatic transmission 14 is a transmission with five forward speeds which is transverse mounted in an FF vehicle and which is made up of a combination of three planetary gearsets 40, 42, and 46. Alternatively, however, the number of planetary gearsets which combine to make up the automatic transmission 14 may be a number other than three.

Also, the automatic transmission 14 may also be a longitudinal mounted type for a FR (front engine-rear drive) vehicle.

Further, according to the foregoing exemplary embodiment, the ECU 90 may comprise a plurality of computers such as an engine electronic control unit and a shift electronic control unit, or may be a portion of a host computer.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. An apparatus for controlling ignition timing during a shift in a vehicular automatic transmission, comprising:
    an ignition timing controller that controls an ignition timing retard amount;
    a basic retard calculator that calculates a basic retard amount required to temporarily reduce an input torque of an automatic transmission provided with the controller;
    a detector that detects an engine retard amount of an ignition timing successively required by engine conditions;
    a determinator that determines a retard correction value based on a shift mode of the automatic transmission and an input torque related value of the automatic transmission; and
    a corrector that corrects the ignition timing retard amount of the controller based on the retard correction value determined by the determinator, the basic retard amount, and the engine retard amount.

2. The apparatus according to claim 1, wherein the basic retard amount is a value having a preset relationship with the input torque related value and a vehicle speed.

3. The apparatus according to claim 1, wherein the engine retard amount is a value determined according to an engine speed in order to suppress knocking of the engine.

4. The apparatus according to claim 1, wherein the input torque related value is a vehicle speed.

5. The apparatus according to claim 1, wherein the retard correction value is a value having a preset relationship with the shift mode of the automatic transmission and the input torque related value.

6. The apparatus according to claim 1, wherein the retard correction value is less than 1.

7. The apparatus according to claim 1, wherein the corrector corrects the ignition timing retard amount by multiplying the retard correction value by the engine retard amount.

8. The apparatus according to claim 1, wherein the ignition timing retard amount to be corrected is related to the basic retard amount, the engine retard amount, and the retard correction value according to a relational expression.

9. A method for controlling ignition timing during a shift in a vehicular automatic transmission, comprising the steps of:
    determining a basic retard amount required to temporarily reduce an input torque of an automatic transmission provided with a controller that controls an ignition timing retard amount;
    determining an engine retard amount which is a retard amount of an ignition timing successively required by engine conditions;
    determining a retard correction value based on a shift mode of the automatic transmission and an input torque related value of the automatic transmission;
    calculating an ignition timing retard amount from the basic retard amount, the engine retard amount, and the retard correction value; and
    retarding the ignition timing of the engine based on the calculated ignition timing retard amount.

10. The control method according to claim 9, wherein the basic retard amount is a value having a preset relationship with the input torque related value and a vehicle speed.

11. The control method according to claim 9, wherein the engine retard amount is a value determined according to an engine speed in order to suppress knocking of the engine.

12. The control method according to claim 9, wherein the input torque related value is a vehicle speed.

13. The control method according to claim 9, wherein the retard correction value is a value having a preset relationship with the shift mode of the automatic transmission and the input torque related value.

14. The control method according to claim 9, wherein the retard correction value is less than 1.

15. The control method according to claim 9, wherein the ignition timing retard amount is calculated by multiplying the engine retard amount by the retard correction value.

16. The control method according to claim 9, wherein the ignition timing retard amount is related to the basic retard amount, the engine retard amount, and the retard correction value.

* * * * *